318-135. SR 05-22-73 XR 3,735,231

United States Patent [19]

Sawyer

[11] 3,735,231

[45] May 22, 1973

[54] LINEAR MAGNETIC DRIVE SYSTEM

[76] Inventor: Bruce A. Sawyer, 20120 Allentown Drive, Woodland Hills, Calif. 91364

[22] Filed: June 28, 1971

[21] Appl. No.: 157,558

[52] U.S. Cl. ......................318/687, 318/135, 310/12
[51] Int. Cl. ..............................................G05b 11/00
[58] Field of Search....................318/38, 135, 8, 687; 310/13, 12; 346/29

[56] References Cited

UNITED STATES PATENTS

| | | | |
|---|---|---|---|
| 3,376,578 | 4/1968 | Sawyer | 346/29 |
| 3,656,014 | 4/1972 | Rich | 310/13 |
| 2,833,941 | 5/1958 | Rosenberg et al. | 309/149 |
| 3,146,386 | 8/1964 | Gerber | 318/8 |
| 3,268,747 | 8/1966 | Snowdon | 318/135 X |
| 3,273,727 | 9/1966 | Rogers et al. | 310/13 X |
| 3,357,511 | 12/1967 | Mackie | 310/13 X |
| 3,449,754 | 6/1969 | Stutz | 310/13 X |
| R27,289 | 2/1952 | Sawyer | 318/135 X |
| 3,470,828 | 10/1969 | Powell, Jr. et al. | 310/13 X |

*Primary Examiner*—Benjamin Dobeck
*Attorney*—Smyth, Roston & Pavitt

[57] ABSTRACT

This invention relates to a system in which a head is displaced from, but is in contiguous relationship to, a platen and is driven relative to the platen along either a single axis or a pair of coordinate axes relative to the platen. The head and the platen constitute a motor which is energized to drive the head relative to the platen by generating a force as a result of a change of vector caused by translating a magnetomotive vector. For example, the motor may be induction or hysteresis motor. Means are associated with the head to detect the position of the head relative to the platen as the head is moved relative to the platen. Means may also be associated with the head for preventing the head from rotating as it is moved along the platen. A servo loop may further be included for producing controlled displacements of the head relative to the platen.

33 Claims, 26 Drawing Figures

INVENTOR
Bruce A. Sawyer
By Smyth, Roston & Pavitt
ATTORNEYS

INVENTOR
Bruce A. Sawyer
By Smyth, Roston & Pavitt
ATTORNEYS

INVENTOR
Bruce A. Sawyer
By Smyth, Roston & Pavitt
ATTORNEYS

INVENTOR
Bruce A. Sawyer
By Smyth, Roston & Pavitt
ATTORNEYS

INVENTOR:
Bruce A. Sawyer
By Smyth, Roston & Pavitt
ATTORNEYS

INVENTOR:
Bruce A. Sawyer

By Smyth, Roston & Pavitt
ATTORNEYS

INVENTOR:
Bruce A. Sawyer
By Smyth, Roston & Pavitt
ATTORNEYS

LINEAR MAGNETIC DRIVE SYSTEM

This invention relates to a system for driving a member such as a head relative to a platen along either a single axis or pair of coordinate axes. The invention particularly relates to a system in which the head or the platen constitutes a motor in which a force is generated as a result of a rate of change of energy caused by translating a magnetomotive vector.

Systems for driving a member such as a head relative to a platen have been known for a considerable number of years. In that time, considerable effort has been devoted to perfecting such systems so that the systems will be responsive to the operation of a computer for driving the head and an output member such as a stylus or cutting tool on the head relative to the platen or another member. The systems have been operative either along a single axis or along a pair of coordinate axes. Generally the systems have used a first arm supported by guides at opposite ends of the platen for driving the stylus along the first axis. The first arm has in turn supported a second member movable along the second coordinate axis for driving the stylus along the second axis. The stylus has been supported on the second member so as to become positioned in accordance with the resultant movements of the first arm and the second member.

The systems described in the previous paragraph have certain major disadvantages. One disadvantage is that the movement along each axis is interrelated with and not independent of the movement along the other axis since the member along the second axis is coupled to the arm along the first axis for movement with the arm along the first axis. Another disadvantage is that the arms or the second member generally contacts the guides so that friction between the guides and the arm or the second member is produced to inhibit the speed at which the stylus can be displaced from each desired position to the next. Still another disadvantage is that the arm and the second member are fairly heavy so that their speed of movement is limited. A further disadvantage is that the system does not inherently provide an indication as to the position of the output member such as the stylus at each instant so that complex arrangements have to be provided to obtain such an indication.

The disadvantages described in the previous paragraph are overcome in a system disclosed and claimed in U.S. Pat. No. 3,376,578 issued to me on Apr. 2, 1968, for a "Magnetic Positioning Device." The system disclosed and claimed in U.S. Pat. No. 3,376,578 includes a head which is disposed in displaced but contiguous relationship to the platen so that movement of the head relative to the platen along either a single axis or a pair of coordinate axes occurs without any friction between the head and the platen. Since the head is disposed in displaced but contiguous relationship to the platen, the head can be moved along each axis independently of the movement of the head along the other axis.

The system disclosed in U.S. Pat. No. 3,376,578 uses a variable reluctance motor to provide a displacement of the head relative to the platen. In one embodiment, the variable reluctance motor includes magnetic poles on the platen and magnetic poles on the head in a particular relationship to the poles on the platen. Coils are disposed on the poles on the head. When the coils are energized, they produce an interaction between the magnetic poles on the head and the magnetic poles on the platen to produce a displacement of the head relative to the platen in accordance with the selective energizing of the coils. By providing the poles on the head and the platen, the position of the head relative to the platen can be constantly indicated since each displacement of the poles on the head relative to the poles on the platen represents a finite distance.

The system disclosed in U.S. Pat. No. 3,376,578 includes means for inhibiting the rotation of the head about an axis substantially normal to a surface defined by the first and second coordinate axes. Inhibition of such rotation is desirable in order to insure that proper drive of the head relative to the platen occurs only along the two coordinate axes and that the position of the head relative to the platen is accurately indicated at all times.

This invention relates to a system in which the head and the platen define a motor in which a force is generated as a result of a rate of change of magnetic energy causes by translating a magnetomotive vector. By way of illustration, such a motor maybe an induction motor or a hysteresis motor. In an induction motor, currents are produced in coils in one of the members such as the head. These currents cause magnetic flux to pass through the other member such as the platen such that eddy currents are produced in the platen. The resultant force produced by the flux from the head reacting with the eddy currents in the platen causes a force to be produced which may tend to displace the head relative to the platen.

The system providing the head and the platen as an induction motor has certain of the advantages described above for the system disclosed in U.S. Pat. No. 3,376,578 and using the reluctance motor. For example, in the system providing the head and the platen as an induction motor, the head is disposed in spaced but contiguous relationship to the platen so that it can be moved at a relatively great speed along the platen. Furthermore, in the system providing the head and the platen as an induction motor, an independent displacement of the head relative to the platen can be obtained along the two coordinate axes.

The use of the head and the platen as an induction motor in the system constituting this invention offers certain advantages over the use of a reluctance motor as disclosed in U.S. Pat. No. 3,376,578. For example, the use of the head and the platen as an induction motor allows the motor to be provided with relatively great power and to be operated with relatively great efficiency. This is important when the output member to be driven by the head is relatively heavy. Furthermore, the motor can be constructed relatively easily and inexpensively.

The provision of a system incorporating an induction motor also has other advantages. Unlike the reluctance motor of U.S. Pat. No. 3,376,578, the induction motor has no permanent magnets. Because of this, when the current coils in the motor are not energized, no force is produced between the head and the platen to inhibit the head from being lifted from the head. This facilitates changes in the disposition of the head relative to the platen before any drive of the head relative to the platen is initiated. Another advantage is that, in at least one embodiment of an induction motor, the platen may be an economical sheet of low carbon steel which may be covered with a thin layer of copper.

One disadvantage of the drive system incorporating an induction motor is that the position of the head relative to the platen cannot be indicated through the operation of the motor in itself. However, the invention includes means movable with the head for indicating the position of the head relative to the platen at each instant along the single axis or along the pair of coordinate axes.

Means are also associated with the head for inhibiting the rotation of the head relative to the platen about an axis substantially normal to a surface defined by the pair of coordinate axes. The invention also includes a servo system for controlling the positioning of the head relative to the platen.

Other types of motors may be used in place of the induction motor. For example, a hysteresis motor may also be used. In a hysteresis motor, the production of flux in one of the members such as the head produces hysteresis effects in the iron of the other member such as the platen. The combination of the flux and the hysteresis effect produces a force which may tend to produce a movement of the head relative to the platen.

In the drawings:

FIG. 1*a* is a schematic diagram of one embodiment of the invention and includes schematic representations of a head and a platen, the head including an induction motor;

FIG. 1*b* illustrates in a fragmentary sectional view a modified form of platen;

Figure 7:
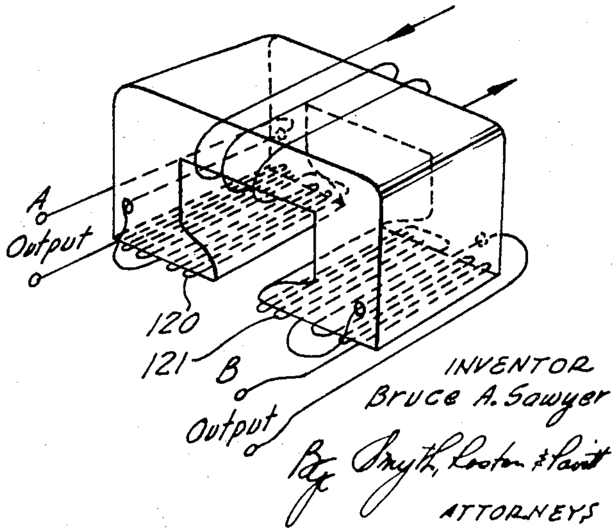
FIG. 7 is a perspective view of poles and windings on a head and of additional windings included on the head to indicate the position of the head when the platen shown in FIG. 2 is used.
Figure 9:
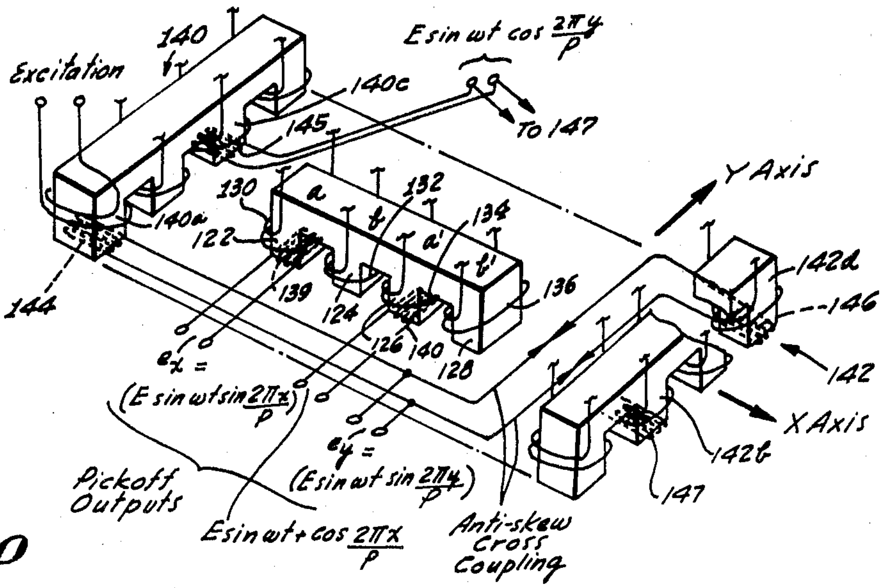
Figures 10, 11:
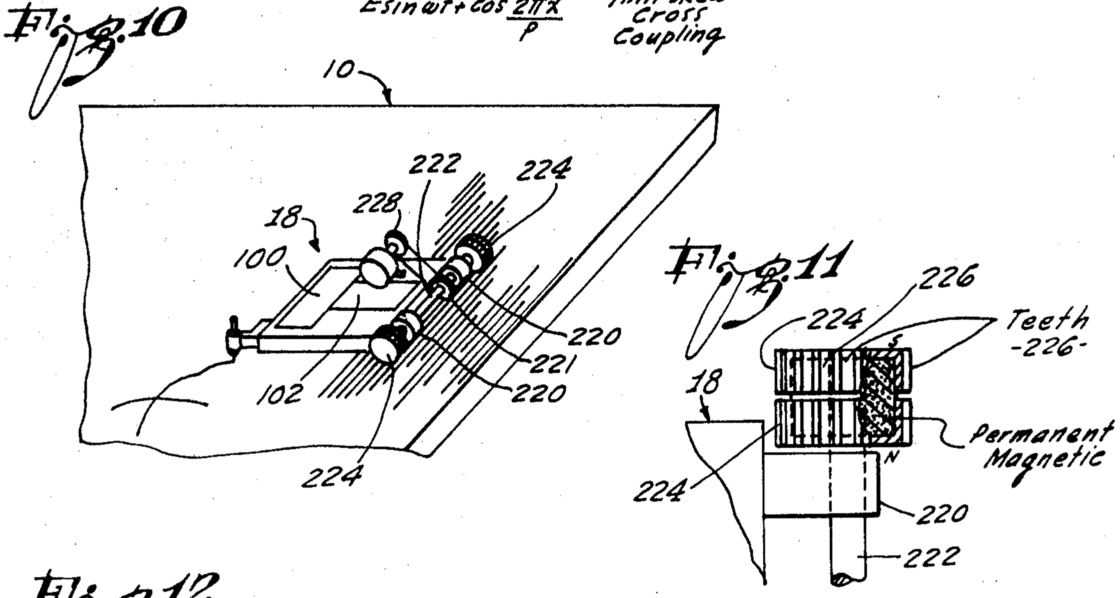
Figure 12:
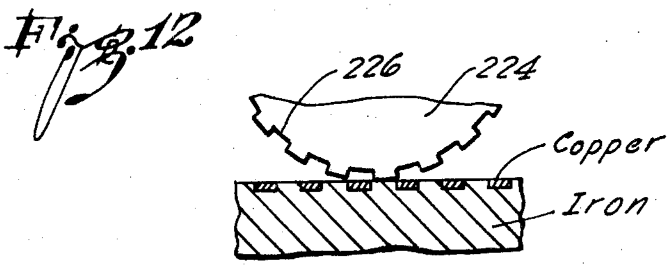
Figures 13, 14, 18:
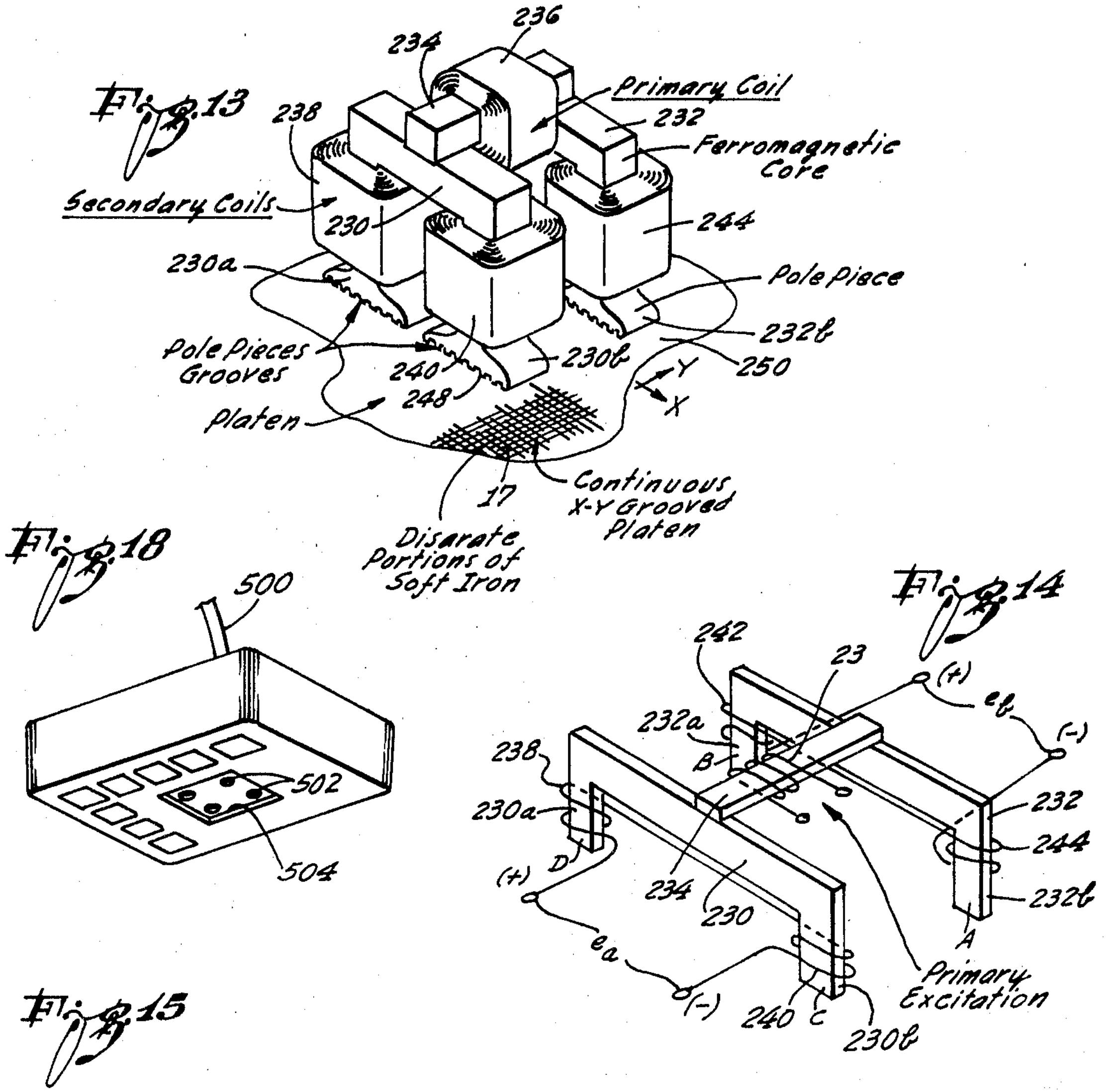
Figure 15:
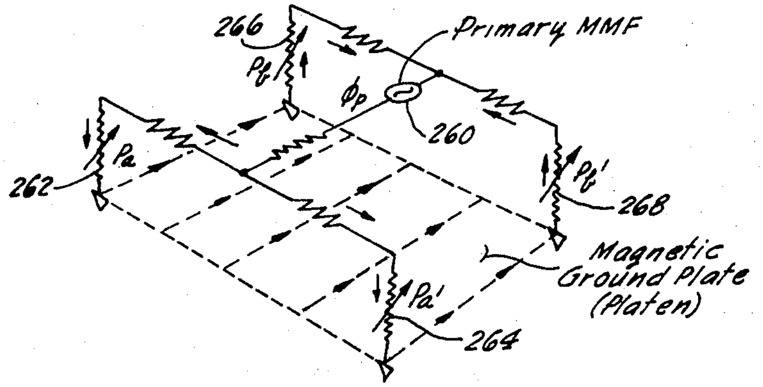
Figure 16:
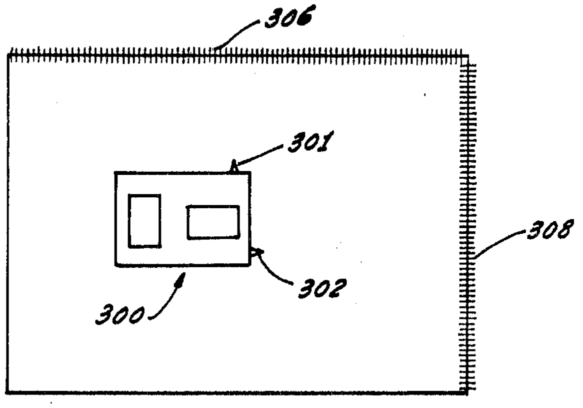
Figure 17:
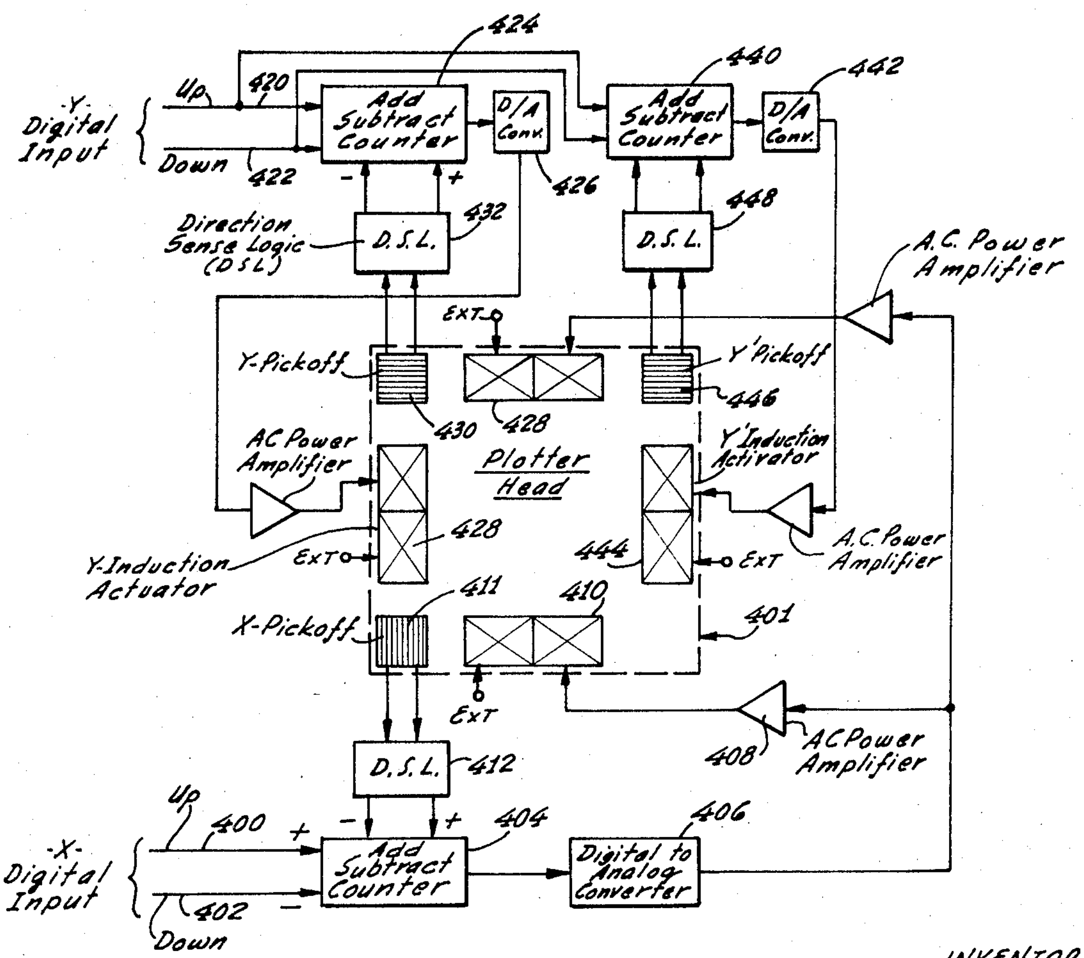
Figure 19:
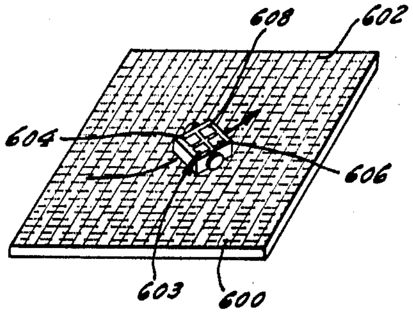
Figure 20:
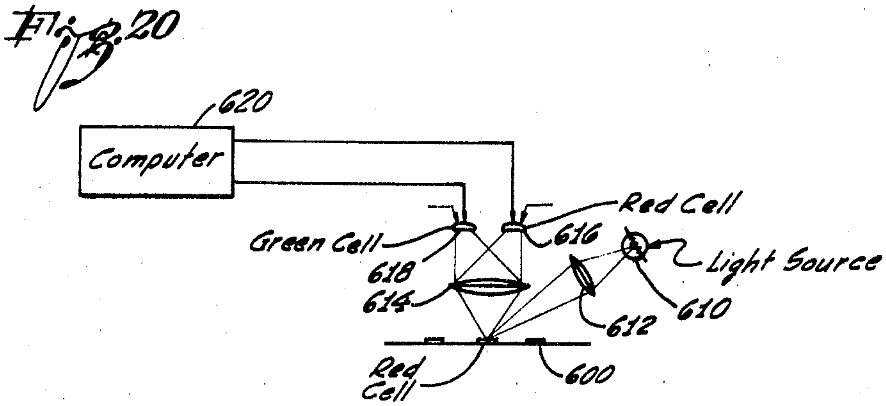
Figure 21:
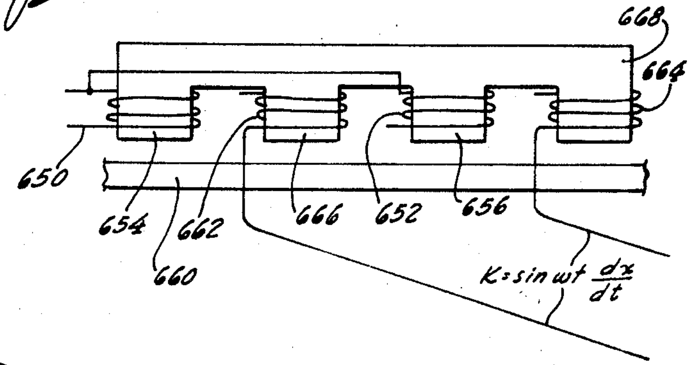
Figure 22:
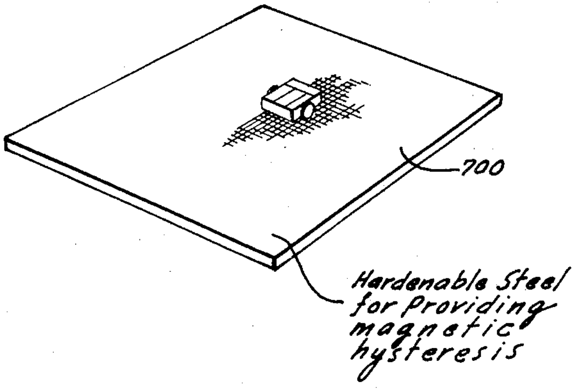

FIGS. 8*a*, 8*b*, 8*c* and 8*d* schematically illustrate the operation of the arrangement shown in FIG. 7 in indicating the displacement and direction of displacement of the head relative to the platen at each instant;

FIG. 9 is a perspective view of a head for preventing the rotation of the head relative to the platen;

FIG. 10 is a perspective view of another arrangement for preventing the rotation of the head relative to the platen;

FIG. 11 is an enlarged fragmentary sectional view of certain members illustrated in FIG. 10;

FIG. 12 is an enlarged fragmentary sectional view of other members illustrated in FIG. 10;

FIG. 13 is a perspective view of another embodiment of apparatus for indicating the position of the head relative to the platen;

FIG. 14 is a perspective view in simplified form of the apparatus shown in FIG. 13;

FIG. 15 illustrates schematically an electrical equivalent of the apparatus shown in FIGS. 13 and 14;

FIG. 16 is a perspective view of another embodiment of the invention for indicating the position of the head relative to the platen at each instant;

FIG. 17 illustrates an electrical circuit, essentially in block form, for providing a closed loop servo system for driving the head relative to the platen;

FIG. 18 is a perspective view schematically illustrating an arrangement for providing an air bearing to maintain the head in spaced, but contiguous, relationship to the platen;

FIG. 19 is a plan view of a system constituting an additional embodiment of the invention for producing linear movements of a head and rotary movements of a head which may be independent and which may occur at the same time as or at different times than the linear movements of the head;

FIG. 20 is an elevational view of apparatus included in the embodiment shown in FIG. 19 for directing light in a particular relationship to cells in the head;

FIG. 21 is a schematic elevational view of apparatus forming an embodiment of the invention for indicating the velocity of the head relative to the platen along a particular axis; and FIG. 22 is a schematic diagram of another embodiment of the invention and includes schematic representations of a head and a platen, the head including a hysteresis motor.

The invention relates to motors which generate a force as a result of a rate of change of magnetic energy caused by translating a magnetomotive force.

In one embodiment of the invention, a platen generally indicated at 10 (FIG. 1) is provided. The platen may be a planar member which may be provided with a layer 12 of soft iron. On top of the continuous sheet of soft iron may be provided a continuous sheet 16 of an electrically conductive material such as copper. Preferably, the sheet 16 is thin. As an alternative, a sheet 16 may be provided on the layer 12 of soft iron and discrete portions 17 of soft iron may be disposed at spaced positions on the sheet to interrupt the sheet. The discrete portions 17 may be continuous with the layer 12 of the soft iron and may be disposed as islands rising above the layer 12. When the sheet 16 is interrupted by the discrete portions 17 of soft iron, it may be considered as a grid. The discrete portions of soft iron may extend upwardly so that their upper surfaces are substantially flush with the upper surface of the sheet 16. It will be appreciated, however, that the sheet 16 may be disposed above the layer 12 of soft iron without departing from the scope of the invention. It will also be appreciated that only the sheet 16 may be used and that a non-magnetic material may be substituted for the layer 12 of soft iron.

The sheet 16 with the discrete portions 17 of iron may be formed in various ways. As one alternative, a continuous sheet 16 of copper may be provided and the discrete portions 17 may be etched from the sheet. As another alternative, the discrete portions !17 of iron may be provided as raised portions and the copper may be deposited between the raised portions to form the sheet 16.

A head generally indicated at 18 is disposed in spaced but contiguous relationship to the platen 10 for movement along either a single axis or a pair of coordinate axes. The head 18 includes a plurality of poles 20 when the head has to be moved relative to the platen along a single axis. When the head 18 is also to be moved relative to the platen 10 along a pair of coordinate axes, the head is also provided with a plurality of poles 22 along the second coordinate axis. The poles 20 and 22 may be formed from laminations to minimize heat losses in the iron.

Figure 2:
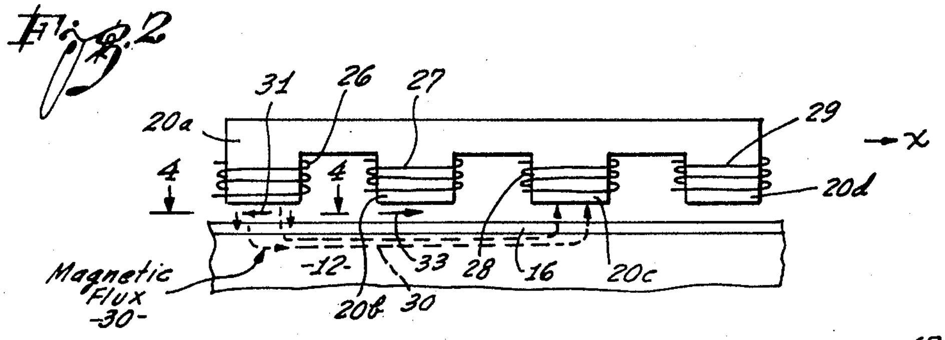
FIG. 2 illustrates in further detail the disposition of the poles and windings on the head relative to the platen for driving the head along one axis relative to the platen.

The head 18 includes a pair of windings 26 and 28 displaced relative to each other (See FIG. 2). The windings 26 and 28 are disposed on alternate ones of he poles 20 and are energized so that magnetic flux extends between the poles 20*a* and 20*c* on which the windings 26 and 28 are disposed. The windings 26 and 28 are provided with a periodic function and may have a substantially constant amplitude at a particular frequency such as 60 cycles per second.

Windings 27 and 29 are respectively disposed on the alternate poles 20*b* and 20*d*. The windings 27 and 29 are energized so that flux extends between the poles 20*b* and 20*d*. When the windings 26 and 28 are provided with a periodic relationship, the windings 27 and 29 are provided with a periodic function having a quadrature phase to the period relationship provided by the windings 26 and 28. The amplitude of the signals applied to the windings 27 and 29 may vary at different times to control the force imparted to the head along the first coordinate axis. For example, the windings 26 and 28 may provide a sine function and the windings 27 and 29 may provide a cosine function.

When the windings 26 and 28 are energized to provide one periodic relationship such as the sine function and the windings 27 and 29 are energized to provide the quadrature periodic relationship, such as the cosine function, a magnetic field is advanced in the direction of the arrows 31 or 33. For example, the magnetic field advances or becomes translated in the direction of the arrow 31 when the windings 26 and 28 and the windings 27 and 29 respectively have a sine and cosine relationship and their resultant vector of energization advances or becomes translated in one direction along the platen. The magnetic field advances or becomes translated in the direction of the arrows 33 when the resultant vector of energizing the windings 26 and 28 along the windings 27 and 29 advances or becomes translated in an opposite direction along the platen relative to the direction of the vector described in the preceding sentence.

Figure 4:
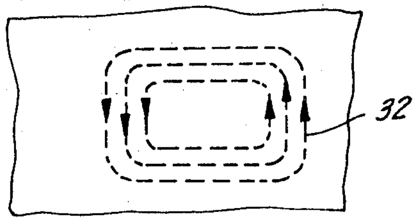
FIG. 4 illustrates schematically eddy currents produced in the platen by the arrangements shown in FIGS. 2 and 3.

When the windings 26 and 28 are energized, they cause the poles 20*a* and 20*c* to produce magnetic flux 30 which threads the platen 10. The flux extends from one of the poles 20*a* and 20*c* around the layer 12 of soft iron and returns in a closed loop to the other one of the poles 20*a* and 20*c*. Similarly, the energizing of the windings 27 and 29 causes magnetic flux to extend between the poles 20*b* and 20*d* and to thread or link the platen 10. Since the flux produced by the windings 26 and 28 and the windings 27 and 29 threads the electrically conductive sheet 16, it causes eddy currents to be induced in the sheet. These eddy currents are indicated at 32 in FIG. 4. The eddy currents 32 and the resultant flux produced by the windings 26 and 28 and the windings 27 and 29 combine to produce a force which is substantially perpendicular to both the direction of the eddy currents 32 and the flux 30. This force is in a direction corresponding to what may be termed the *x*-axis.

The force which may cause a movement or advance of the head 18 relative to the platen 10 along the *x*-axis results from the progressive changes with time in the sine function provided by the windings 26 and 28 and in the cosine function provided by the windings 27 and 29. For example, at a first instant corresponding to an angle of 0°, the windings 26 and 28 have a value of sin 0° and accordingly produce no flux while the windings 27 and 29 have a value of cos 0° and accordingly produce a maximum amount of flux. At a subsequent time, the windings 26 and 28 have a value of sin 45° = 0.707 of the maximum amplitude applied to the windings and the windings 27 and 29 have a value of cos 45° = 0.707 of the maximum amplitude applied to the windings. The resultant flux produced by the windings 26 and 28 and the windings 27 and 29 is shifted in position from that which is produced at the first instant discussed above. This shift in the position of the flux causes eddy currents to be produced in the sheet 16. The combination of the flux and the eddy currents produced in the sheet 16 provides a force on the head relative to the platen in the *x*-direction.

As previously described, the force imparted to the head 18 relative to the platen 10 in the *x*-direction is dependent at each instant upon the amplitude of the signals applied to the windings 27 and 29. By varying the magnitude of the voltage applied to the windings 27 and 29, the strength of the flux produced in the platen 10 by the windings can be correspondingly varied. This in turn causes the magnitude of the eddy currents induced in the sheet 16 to be correspondingly varied. In this way, the force applied to the head 18 to move the head along the *x*-axis can be correspondingly controlled.

The direction of the force applied to the head 18 to move the head relative to the platen 10 in the *x*-direction is dependent upon the polarity of the signal imparted to the windings 27 and 29. For example, a force is applied to the head 18 in one direction to move the head relative to the platen along the *x*-axis when the windings 27 and 29 are energized with *a* + cosine function. A force is applied to the head in an opposite direction to move the head 18 relative to the platen along the *x*-axis when the windings 27 and 29 are energized with *a* − cosine function.

The interaction between the magnetic flux and the eddy currents 32 to produce a movement of the head 18 relative to the platen 10 in a linear direction is similar to the interaction between magnetic flux produced by the stator and the eddy currents produced in the rotor in a rotary type of induction motor. Actually, however, the roles of the stator and rotor in the linear type of motor have been reversed from the roles of the stator and rotor in the rotary type of motor since the coils and poles are disposed on the movable member and the electrically conductive sheet is disposed on the stationary member.

The movement of the head relative to the platen occurs at a speed having a maximum slightly less than the rate at which the flux produced by the windings 26 and 28 and the windings 27 and 29 advances along the platen. Because of this slight difference in speed, the flux continues to cut the sheet 16 as the head moves relative to the platen. This causes eddy currents to be produced in the sheet 16 at a frequency which is the difference between the frequency of the magnetic flux and the rate of movement of the head. For example, if the frequency of the flux is 60 cycles, the frequency of the eddy currents in the sheet 16 may be only 1 or 2 cycles. The frequency of the eddy currents can vary between frequencies of $-f$ and $+2f$ when signals having a frequency of $f$ are applied to the windings 26 and 28 and the windings 27 and 29.

The force for moving the head 18 relative to the platen 10 may be expressed as F = Bi $l$, where F = the force for moving the head relative to the platen along one axis;

B = flux density;

i = the eddy currents in the sheet 16;

$l$ = the length of the sheet 16 through which the eddy currents flow.

Figure 3:
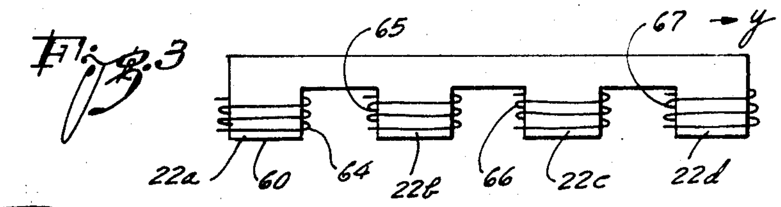
FIG. 3 illustrates in further detail the disposition of the poles and windings on the head relative to the platen for driving the head along a second axis relative to the platen.

The above description has proceeded with respect to movements of the head 18 along a particular axis such as the $x$-axis. It will be appreciated that a similar arrangement may be provided for displacement of the head 18 relative to the platen along a second coordinate axis such as a $y$-axis. For example, poles 22*a*, 22*b*, 22*c* and 22*d*(FIG. 3) may be provided when the head is to be moved along the $y$-axis. Windings 64 and 66 may be disposed relative to each other and wound on the poles 22*a* and 22*c* and energized so that the windings provide a first periodic function such as a sine function. Similarly, windings 65 and 67 may be wound on the poles 22*b* and 22*d* and energized to provide a quadrature periodic function such as a cosine function. The windings 65 and 67 may be provided with a variable amplitude and with a controlled polarity at each instant to control the direction of movement and the acceleration imparted to such movement of the head relative to the platen at each instant along the $y$-axis. The windings 64 and 66 and the windings 65 and 67 produce eddy currents in the sheet 16 in accordance with the production of magnetic flux by the windings and the passage of this magnetic flux through the sheet 16 and the layer 12 of soft iron. The combination of the production of magnetic flux by the windings 64 and 66 and the windings 65 and 67 and the eddy currents by the sheet 16 produces a force which may tend to move head along the $y$-axis as the vector of the current from the windings 64 and 66 and the windings 65 and 67 advances.

It will be appreciated that the platen 10 does not have to include any layer 12 of soft iron. The soft iron is advantageous because it enhances the production of magnetic flux. However, magnetic flux will be produced by the windings 26 and 28 and the windings 27 and 29 and by the windings 64 and 66 and the windings 65 and 67 even without the inclusion of the magnetic layer 12 and this magnetic flux will link the sheet 16 and produce eddy currents in the sheet.

Figure 5:
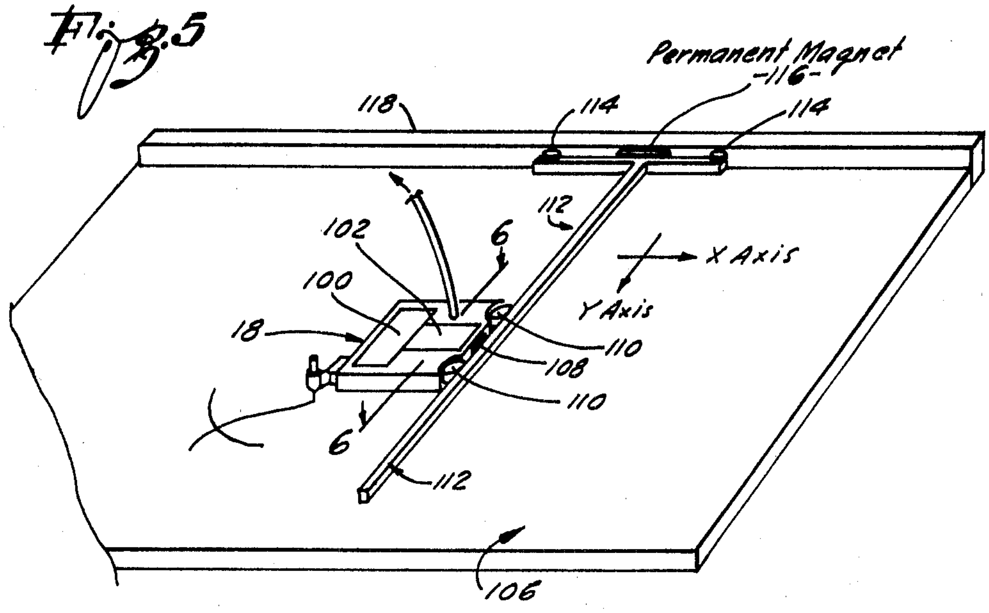
FIG. 5 is a perspective view of an arrangement for preventing the head from rotating relative to the platen.
Figure 6:
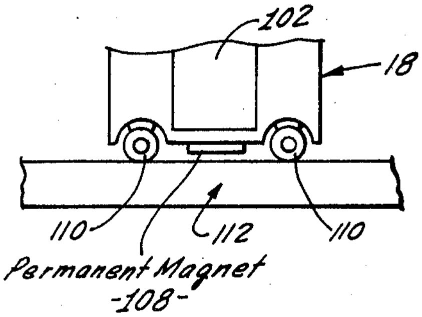
FIG. 6 is an enlarged fragmentary elevational view of certain details of the embodiment shown in FIG. 5.

An embodiment for inhibiting the rotation of the head is shown in FIGS. 5 and 6. This embodiment includes a pair of induction motors 100 and 102 for driving the head generally indicated at 18 relative to a platen generally indicated at 106 along a pair of coordinate axes such as the $x$-axis and the $y$-axis. The head is provided at one end with a permanent magnet 108 at a position intermediate the extremities at that end and is further provided with a pair of rollers 110 at positions straddling the magnet 108 at that end.

The rollers 110 engage one leg of a T-shaped bar 112 made from a soft iron or a material covered with a sheet of soft iron. The T-shaped bar 112 is accordingly attracted by the permanent magnet 108 for movement with the head 104 in the $x$-direction. Since the rollers 110 engage the leg of the T-shaped bar 112 at a pair of spaced positions, any tendency for the head to rotate is inhibited.

The other leg of the T-shaped bar 112 is disposed in the $x$-direction and is provided with a pair of rollers 114 at its opposite ends and with a permanent magnet 116 at an intermediate position between the rollers. The magnet 116 is disposed in contiguous relationship to a rail 118 made from soft iron. The attraction between the magnet 116 and the rail 118, in conjunction with the disposition of the rollers 114 against the rail, further operates to insure that the head will be inhibited from rotating about an axis substantially normal to a surface defined by the pair of coordinate axes.

As previously described, the electrically conductive sheet 16 may be continuous or may be interrupted by discrete portions 17. The sheet 16 interrupted by the discrete portions 17 has certain advantages over the continuous sheet. One advantage is that the layer 12 of soft iron can be disposed closer to the head 18 when the sheet 16 is interrupted by the discrete portions 17 of soft iron than when the sheet 16 is continuous. Because of this, the air gap between the head 18 and the layer 12 of soft iron can be reduced so that the strength of the magnetic flux extending between the head and the layer 12 for any given amplitude of current is enhanced. This in turn causes the efficiency of the motor to be increased.

The provision of the sheet 16 interrupted by the discrete portions 17 also has other advantages. As will be appreciated, the system described above may be able to move independently along the two coordinate axes but it is not able to determine the position of the head relative to the platen at each instant when the sheet 16 is continuous. In this respect, the system described above is different from the system disclosed in U.S. Pat. No. 3,376,578 since the system disclosed in U.S. Pat. No. 3,376,578 is inherently able to determine the position of the head relative to the platen at each instant as the head is moved relative to the platen along the two coordinate axes.

By interrupting the sheet 16 by the discrete portions 17, various means may be associated with the head 18 and movable with the head to sense the movement of the head past the discrete portions or past the portions of the sheet between the discrete portions. For example, such means may be provided with magnetic characteristics to sense the movement of the head in the $x$-direction and in the $y$-direction past each of the discrete portions 17 of soft iron. As an alternative, such means may be provided with other characteristics to sense the movement of the head in the $x$-direction and in the $y$-direction past the positions between the discrete portions of soft iron. Various means may also be provided for inhibiting the rotation of the head relative to the platen about an axis substantially normal to a surface defined by the pair of coordinate axes.

The embodiment shown in FIG. 7 responds to the displacement of the head past the portions of the copper sheet 16 between the discrete portions 17 of soft iron to indicate the position of the head relative to the platen at each instant. The embodiment shown in FIG. 7 includes a pair of tertiary windings 102 and 121 each of which may be in the form of a printed circuit. The windings 120 and 121 re movable with the head and are disposed in contiguous relationship to the sheet 16. The windings 120 and 121 may be respectively disposed on the poles corresponding to the poles 20*a* and 20*c* in FIG. 2 at positions corresponding to the exposed ends of such poles. If the sheet 16 is considered as constituting a secondary winding in the sense that eddy currents are produced therein, the windings 120 and 121 may be considered as constituting tertiary windings.

When the windings 120 and 121 are disposed in contiguous relationship to the portions of the sheet 16 between the discrete portions 17 of soft iron, they are responsive to the eddy currents induced in the sheet 16. These eddy currents produce a magnetic flux which link the windings 120 and 121 and cause relatively large voltages to be induced in the windings. However, when the windings 120 and 121 are disposed in contiguous relationship to the discrete portions 17 of soft iron, a relatively low voltage is induced in the windings. In this way, voltages are alternately induced and not induced in the windings 120 and 121 as the head is displaced relative to the platen along the $x$-axis. This causes periodic signals to be induced in the windings 120 and 121 as the head is displaced relative to the platen along the $x$-axis.

Figures 8A, 8B:
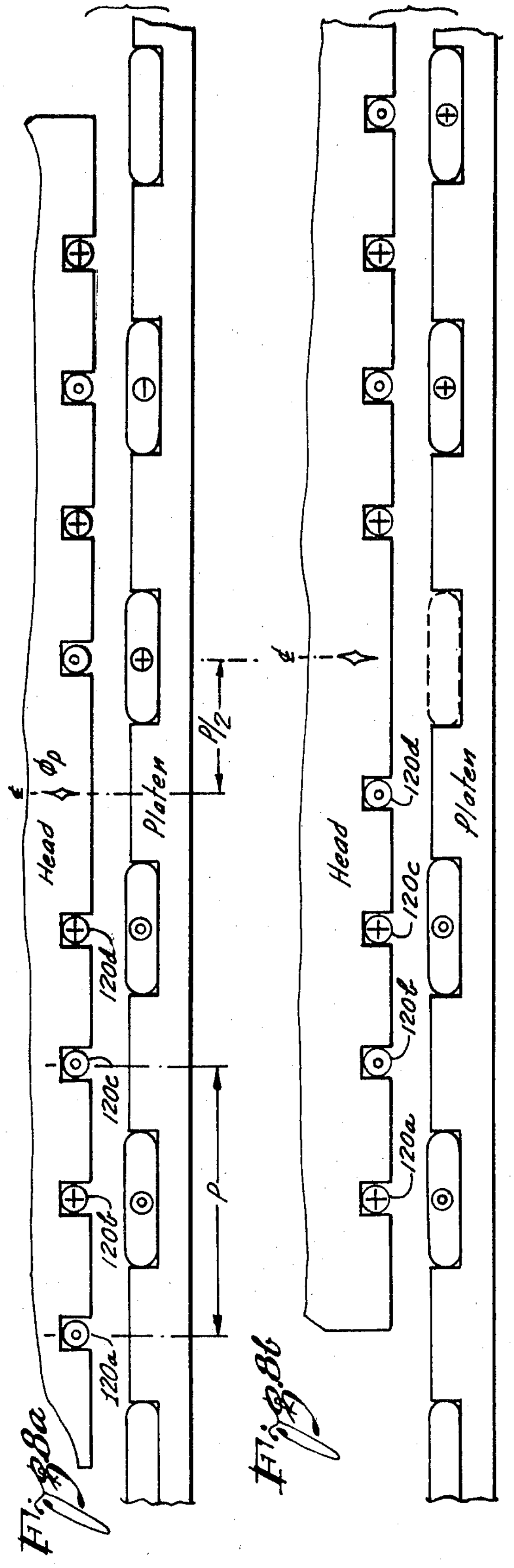
Figures 8C, 8D:
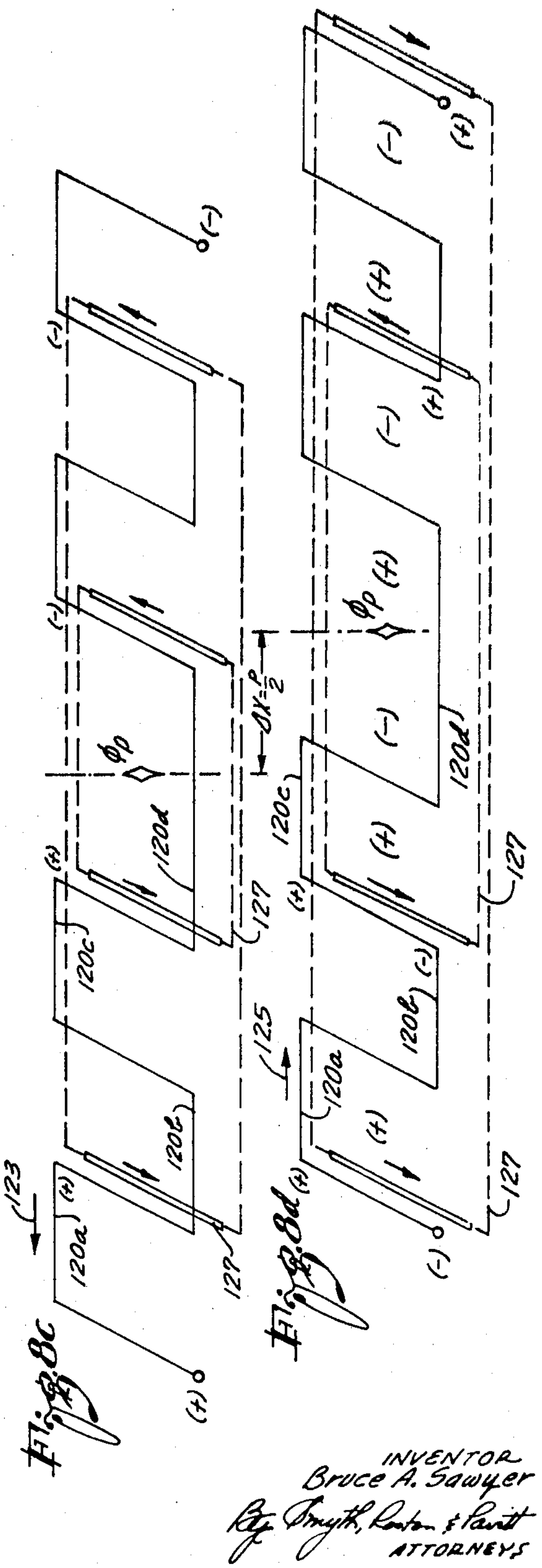

FIG. 8*a* illustrates successive turns 120*a* and 120*b*, 120*c*, 120*d*, etc. of the tertiary winding 120 in one disposition of the head relative to the platen. FIG. 8*b* illustrates the disposition of these turns 120*a*, 120*b*, 120*c*, 120*d*, etc. in a displaced relationship of the head to the platen relative to the disposition shown in FIG. 8*a*. FIG. 8*c* illustrates the turns 120*a*, 120*b*, 120*c*, 120*d*, etc. in schematic form and further illustrates the eddy currents 127 in the sheet 16 forming a part of the platen when the turns have the disposition shown in FIG. 8*a*. FIG. 8*d* illustrates the turns 120*a*, 120*b*, 120*c*, 120*d*, etc. in schematic form and further illustrate the eddy currents 127 in the sheet 16 forming a part of the platen when the turns have the disposition shown in FIG. 8*b*.

When the head is in the position illustrated in FIGS. 8*a* and 8*c*, the eddy currents 127 in the sheet 16 are disposed adjacent the right edge of the turn 120*a* in the tertiary winding 120. These eddy currents in the sheet 16 cause a voltage indicated by an arrow 123 to be induced in the turn 120*a* of the tertiary winding. However, when the head is in the position illustrated in FIGS. 8*b* and 8*d*, the eddy currents 127 in the sheet 16 are disposed adjacent the left edge of the turn 120*a* in the tertiary winding 120. These eddy currents in the sheet 16 cause a voltage indicated by an narrow 125 to be induced in the turn 120*a* of the tertiary winding. As will be appreciated, the voltage 125 is in the opposite direction to the voltage 123. This indicates that an electromotive force (or voltage) having a periodic function is induced in the winding 120*a* as the head becomes displaced relative to the platen.

The embodiment shown in FIG. 9 includes the features for inhibiting rotation of the head about an axis substantially normal to the surface defined by the pair of coordinate axes. In the embodiment shown in FIG. 9, a plurality of poles 122, 124, 126 and 128 are provided along the $x$-axis. Windings 130, 132, 134 and 136 are respectively disposed on the poles 122, 124, 126 and 128. The windings 130 and 134 are connected in series such that magnetic flux is able to pass into the pole 122 and out of the pole 126 to provide a closed loop for the flux. Similarly, the windings 132 and 136 are connected in series such that magnetic flux is able to pass into the pole 124 and out of the pole 128 to provide a closed loop for the flux. The windings 130 and 134 provide a period function such as a sine signal and the windings 132 and 136 provide a quadrature function, such as cosine signal. For example, by providing a sine function and a cosine function, movement of the head relative to the platen can be obtained along the $x$-axis. Tertiary windings 139 and 140 are provided on the poles 130 and 134 to receive induced voltages when the poles are adjacent to the sheet 16 in a manner similar to that described in connection with the embodiments shown in FIGS. 7 and 8 and described above. When the primary windings receive signals having a frequency $\omega$, the voltage induced in the tertiary winding 139 may be E $\sin\omega t \sin 2\pi x/p$, where $x$ indicates the displacement of the head along the $x$-axis and $p$ indicates the pitch, which may be defined as the distance between the centers of successive pairs of discrete portions 17. Similarly, the voltage induced in the winding 140 may be designated as E $\sin\omega\, t \cos 2\pi x/p$. Tertiary windings may also be disposed on the poles 132 and 136 in a manner similar to that described above and illustrated in FIG. 7.

The embodiment shown in FIG. 9 includes for the $y$-axis a pair of spaced assemblies generally indicated at 140 and 142. Each of the assemblies 140 and 142 is constructed in a manner similar to that described above in the previous paragraph for the assembly along the $x$-axis. A tertiary winding 144 is disposed on a pole 140*a* at one end of the assembly 140 and a tertiary winding 145 may be disposed on a pole 140*c* in the assembly 140. The tertiary windings 144 and 145 may be disposed at the exposed ends of their respective poles. Similarly, a tertiary winding 146 is disposed on a pole 142*d* at the opposite end of the assembly 142 from the disposition of the pole 140*a* in the assembly 142 and a tertiary winding 147 may be disposed on a pole 142*b*i the assembly 142. The tertiary windings 144 and 146 are connected in a parallel relationship and the tertiary windings 145 and 147 may also be connected in a parallel relationship. By providing such a connection in a relationship diagonally across the head, any tendency for the head to rotate about an axis substantially normal to the surface defined by the $x$-axis and the $y$-axis will cause voltages to be induced in the tertiary windings 144 and 146 and in the windings 145 and 147. These voltages will produce currents in the windings 144 and 146, the currents being in a direction to produce force couples which oppose such undesirable rotations. Similarly, the voltages will produce currents in the windings 145 and 147, the currents being in a direction to produce force couples which oppose such undesirable relationships. In this way, the head is maintained in a position coordinate with the $x$-axis and $y$-axis. This is desirable to insure that the movement of every position on the head is always through the desired distances along the $x$-axis and the $y$-axis.

It will be appreciated that other windings on the assemblies 140 ad 142 may be diagonally connected in a manner similar to the windings 144 and 146 to enhance the effect of inhibiting rotation of the head. For example, tertiary windings may be disposed on the other pair of poles in the assemblies 140 and 142 and may be connected in parallel in a manner similar to the windings 144 and 146 and the windings 145 and 147. Furthermore, a pair of pole assemblies may be provided for the

*x*-axis in a manner similar to the disposition of the pole assemblies 140 and 142 for the *y*-axis and tertiary windings on these pole assemblies may be cross connected in a manner similar to that described above for the pole assemblies 140 and 142.

The embodiment shown in FIGS. 10, 11 and 12 also operates to inhibit the rotation of the head relative to the platen about an axis substantially normal to a surface defined by the *x*-axis and the *y*-axis. The head 104 includes the induction motors 100 and 102 as in the embodiment shown in FIGS. 5 and 6. A pair of bearings 220 are disposed in displaced relationship. The bearings 220 support a shaft 222 for rotation in the bearings. The shaft 222 in turn supports at each opposite end a pair of half wheels 224 which constitute permanent magnets and which have teeth 226. The teeth 226 have dimensions corresponding to the dimensions of the iron between the discrete portions 17 of the conductive sheet 16. As the head 18 moves in the *x*-direction, the magnetic teeth 226 rotate and come into contiguous relationship with the soft iron constituting the discrete portions 17 of the conductive sheet 16. The shaft 222 may be considered as movable along the *x*-axis and as being disposed along the *y*-axis when properly aligned. When the shaft 222 is properly aligned on the *y*-axis, no forces are produced for changing the direction of the shaft. The reason is that the magnets formed by the half wheels 224 at the end of the shaft have equal forces applied to them. However, when the shaft 222 becomes misaligned, tangential forces are developed which produce a force couple to provide alignment. The force couple particularly results when one of the half wheels is disposed adjacent to the copper sheet 16 and the other half wheel is disposed adjacent to one of the discrete portions 17 of soft iron. A precision potentiometer or other analog or digital pickoff 228 may be mounted on the shaft 222 to sense the rotation of the shaft and accordingly the movement of the head relative to the platen.

In FIGS. 13, 14 and 15, another embodiment is shown for indicating the position of the head relative to the platen at each instant. The embodiment includes a first member 230 having an inverted U-shape and made from a suitable ferromagnetic material such as laminated soft iron or ferrite. A second member 232 having a configuration and construction corresponding to that of the first member 230 is disposed in spaced and parallel relationship to the member 230. A cross bar 234 also made from a ferromagnetic material such as a laminated soft iron or a ferrite extends across the tops of the members 230 and 232 and maintains the members 230 and 232 in fixed relationship to each other.

A primary winding 236 is disposed on the cross bar 234. A pair of windings 238 and 240 are respectively disposed on the legs 230a and 230b of the member 230 and are connected in a series relationship. The legs **230*a* and 230*b* may also be made from a magnetic material such as a laminated soft iron or a ferrite. A pair of windings 242 and 244 are also respectively disposed on the legs 232*a* and 232*b* of the member 232 and are connected in a series relationship. When the primary winding is energized with a periodic signal, windings 238 and 240 have a periodic voltage such as a voltage with a sinusoidal envelope induced in them and the windings 242 and 244** have a periodic voltage such as a voltage with a cosine envelope induced in them.

The legs 230 and 232 are movable with the head such as the head 18 shown in FIGS. 1 to 5, inclusive. The legs 230 and 232 are provided with teeth 248 which are preferably equally spaced relative to each other and which are separated from one another by grooves. The legs are movable relative to a platen 250 defined by a magnetic grid formed from the sheet 16 and the discrete portions 17 of soft iron. The spacing between the teeth 248 may correspond to the spacing between the discrete portions 17 of soft iron. The teeth 248 on the leg **230*a* have a different disposition relative to the discrete portions 17 on the platen than the teeth 248 on the leg 230*b*. Similarly, the teeth 248 on the leg 232*a* have a different disposition relative to the discrete portions 17 on the platen than the teeth 248 on the leg 232*b*. The disposition of the teeth on the legs 230*a* and 230*b* relative to the discrete portions 17** on the platen may be similar to that described in U.S. Pat. No. 3,376,578 or in U.S. Pat. No. 3,457,482.

When the primary winding 236 is energized, magnetic flux passes between the teeth 248 in the associated legs such as the legs 230 and the discrete portions 17 in the platen 250. In certain positions of the legs **230*a* and 230*b* relative to the discrete portions 17 on the platen, most of the flux from the primary winding 236 passes through the leg 230*a* and the platen 250 when the poles 230 and 230*b* are energized. This causes a voltage of high amplitude to be induced in the winding 238. In other positions of the legs 230*a* and 230*b* relative to the layer of soft iron on the platen, substantially all of the flux passes between the leg 230*b* and the platen when the primary winding 236 is energized. This causes a voltage of high amplitude to be induced in the winding 240. In still other positions of the legs 230*a* and 230*b* relative to the platen, the flux passes through both the legs 230*a* and 230*b*. This causes voltages to be induced in the windings 238 and 240. Although this may constitute a simplified explanation of the operation of the system shown in FIGS. 13, 14 and 15,** it will be appreciated that the voltages induced in the different windings may be considered as analog and that the system operates on an analog basis.

The sum of the flux passing through the legs **230*a* and 230*b* is substantially constant in any position of the legs relative to the platen. This results from the fact that the permeance or reluctance of the legs 230*a* and 230*b* relative to the platen 250 in composite is substantially constant. A similar arrangement exists between the passage of flux from the legs 232*a* and 232*b* to the platen 250 such that the total amount of flux passing through the legs 232*a* and 232*b* in any position of the legs relative to the platen 250** is substantially constant.

The electrical circuit equivalent of the embodiment described above is shown in FIG. 15. This electrical circuit equivalent includes a signal source 260 which corresponds to the magnetomotive force produced by the winding 236. On the basis of the electrical circuit equivalent shown in FIG. 15, a signal approximating a periodic function such as a sine wave is produced in the legs which include resistors 262 and 264, and a signal having quadrature periodic function such as a cosine wave is approximated in the legs which include resistors 266 and 268. The resistors 262, 264, 266 and 268 simulate the variable magnetic reluctance between the legs **230*a* and 230*b* and the platen 250 and the legs 232*a* and 232*b* and the platen 250.** Signals representing such periodic functions as sine and cosine waves are produced in order to determine both the displacement and direction of displacement of the head relative to the platen along the *x*-axis.

The arrangement shown in FIG. 13, 14 and 15 provides an indication of the displacement of the head relative to the platen along a single axis such as the *x*-axis. An arrangement similar to that shown in FIG. 13, 14 and 15 may be used to provide an indication of the displacement of the head relative to the platen along the other axis such as the *y*-axis.

When a continuous sheet 16 is used, various types of means may be disposed on the head to indicate the displacement of the head relative to the platen. For example, a head 300, (FIG. 16) may carry a pair of lasers 301 and 302. The laser 301 is disposed to direct a beam to a plurality of optical members 306 disposed on the platen at equally spaced positions along the *x*-axis. As the head moves along the *x*-axis, the laser 301 energizes different ones of the members 306 to provide an indication of the position of the head along the *x*-axis. Similarly, a plurality of optical members 308 may be disposed on the platen at equally spaced positions along the *y*-axis. As the head moves along the *y*-axis, the laser 302 energizes different ones of the members 308 to provide an indication of the position of the head along the *y*-axis. Suitable means may be provided to prevent rotation of the head about an axis substantially perpendicular to the surface defined by the *x* and *y*-axes.

FIG. 17 illustrates schematically a closed-loop servo system for driving a head generally indicated at 401 relative to a platen. The embodiment shown in FIG. 17 not only drives the head relative to the platen but also inhibits rotation of the head relative to the platen.

In the embodiment shown in FIG. 17, signals representing the desired movement of the head relative to the platen along the *x*-axis are introduced to a line 400 to drive the head in one direction and to a line 402 to drive the head in the opposite direction. The signals from the lines 400 and 402 are introduced to an add-/subtract counter 404 which adds or subtracts counts in accordance with the introduction of signals from the lines 400 and 402.

The signals from the add/subtract counter 404 are introduced to a digital-to-analog converter 406 and the resultant analog signals are introduced to an amplifier 408. The signals from the power amplifier 408 are introduced to an arrangement 410 such as the windings shown in FIG. 2 to drive the head along the *x*-axis. The resultant movements of the head along the *x*-axis are sensed by a pickoff 411 which introduces signals to direction sense logic 412 for indicating the direction and magnitude of such displacement. The signals from the direction sense logic 412 are introduced to the add-/subtract counter 404 to subtract from the signals introduced to the counter from the lines 400 and 402. In this way, the counter 404 produces an indication at each instant of the difference between the actual and desired displacement of the head relative to the platen along the *x*-axis. This difference is used to provide forces on the head for moving the head relative to the platen so that the actual movement of the head corresponds to the desired movement.

In like manner, input lines 420 and 422 are provided to receive signals representing the desired displacement along the *y*-axis. These lines are included in a closed loop servo for the *y*-axis similar to that described above for the *x*-axis. The closed loop servo includes an add/subtract counter 424, a digital-to-analog converter 426, a driving arrangement 428, pickoff 430 and direction sense logic 432. This servo loop produces forces on the head to move the head in the *y*-direction in a manner corresponding to the signal indications introduced to the lines 420 and 422.

An add/subtract counter 440 also receives the signals from the lines 420 and 422. The signals from the counter 440 are converted to analog form by a digital-to-analog converter 442 and are amplified and introduced to a drive arrangement 444. A pickoff 446 may be provided to detect the movement of the head along the *y*-axis at the position of the pickoff. The signals from the pickoff 446 may be introduced to direction-sense logic 448 which indicates the direction and magnitude of the head displacement and introduces the signals to the counter 440 to control the further movements of the head.

If the head is not being rotated, the movement sensed by the pickoff 430 will correspond to the movement sensed by the pickoff 446. This means that the drives provided by the arrangements 428 and 444 will be substantially equal. However, if the head has rotated about an axis substantially normal to a surface defined by the first and second axes, the indications sensed by the pickoff 430 will not be equal to the indications sensed by the pickoff 444. This means that the arrangement 428 will provide a different drive along the *y*-axis than the arrangement 444. The difference in drive will cause the head to be rotated in a direction to counteract any previous rotation of the head.

It will be appreciated that the arrangement shown in FIG. 9 can also be used to correct for rotation of the head relative to the platen about an axis substantially normal to a surface defined by the *x*-axis and the *y*-axis. When the arrangement shown in FIG. 9 is used, the inputs 400 and 402, the add/subtract counter 404, the digital-to-analog converter 406, the amplifier 408, the drive arrangement 410, the pickoff 411 and the direction-sense logic 412 may still be provided for the x-axis. However, the pickoffs 411 may constitute the tertiary windings shown in FIG. 9.

Similar means may be provided for the *y*-axis. For the *y*-axis, both the drive arrangements 428 and 444 may be cross connected in a manner similar to that shown in FIG. 9 and described above. When the arrangement shown in FIG. 9 is used, the pickoffs 430 and 446 are effectively replaced by the tertiary windings such as the windings 144 and 145 and the windings 146 and 147 shown in FIG. 9. These windings provide the periodic signals having the quadrature relationship such as the sine and the cosine signals.

An air bearing arrangement may be provided to keep the head spaced from, but contiguous to, the platen. The air bearing arrangement may take various forms, one form being shown in FIG. 18. The air bearing arrangement includes a control line 500 which is adapted to receive air under pressure. The fluid introduced to the control line 500 passes through four openings 502 in the surface of the head adjacent to the platen. The openings 502 may be provided in a cavity 504 which may be a few thousands of an inch deep. In this way, air under pressure in the control line 500 passes through the openings 502 and passes along the surface between the head and the platen to maintain the head slightly spaced from the platen.

In the embodiments described above, means have been included for insuring that the head is prevented from rotating. As will be appreciated, it may sometimes be desired to rotate the head. For example, it may be desired to move the head in a first direction from a first position to a second position so that the movement occurs along the *x*- and *y*- coordinates with the head pointing in a first direction. It may then be desired to rotate the head at a second position so that the head points in a second direction different from the first direction. It may then be desired to move the head in the second direction from the second position to a third position removed from the second position. It may also be desired to rotate the head at the same time that it is moving from one position to another.

Figure 1A:
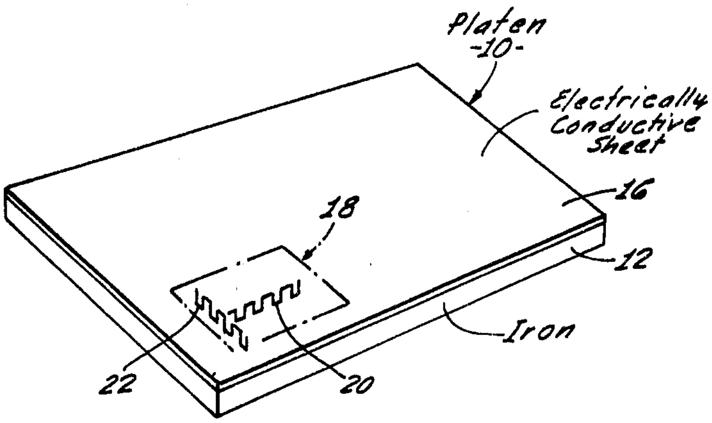
Figure 1B:
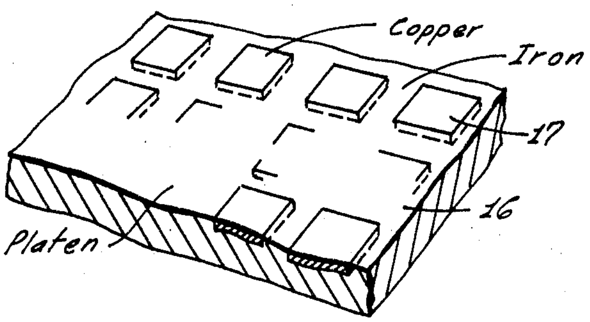

In the embodiment shown in FIG. 19 and 20, apparatus such as shown in FIG. 1 includes an electrically conductive sheet 16. The sheet 16 may be provided with equally spaced stripes 600 of a first color such as green, the stripes being disposed along the *x*-axis. The sheet 16 may also be provided with equally spaced stripes 602 of a second color such as red, the stripes being disposed along the *y*-axis. When it is desired to move from the first position to the second position, the direction of movement is controlled by the ratio of the red lines to the green lines as traversed by the head 603.

A head generally indicated at 603 is disposed in contiguous relationship to the head in a manner similar to that described above. The head may be provided with a first induction motor 604 disposed in one corner of the head for moving the head along the *x*-axis. The head may be provided with a second induction motor 606 in a diagonally opposite corner of the head for moving the head along the *x*-axis. The head may be further provided with a third induction motor 608 disposed on the head for moving the head along the *y*-axis.

Each of the induction motors 604 and 606 has a similar construction. For example, each of the induction motors may have a first pair of cells displaced from each other to respond to the red lines and a second pair of cells displaced from each other to respond to the green lines. Specifically, for the induction motor 604 a light bulb 610 may be provided and a lens 612 may be disposed relative to the light bulb 610 to focus light on the green stripes 600. The light reflected by the green stripes 600 then passes through a lens 614 to a pair of cells 616 and 618 displaced a specific distance from each other to provide a particular phase relationship such as a quadrature phase relationship. One of the cells may be a red cell and the other may be a green cell. For example, the cell 616 may provide a sine signal and the cell 618 may provide a cosine signal. Similar arrangements may be provided for the red and green cells in the induction motor 604 and for the red and green cells in the induction motor 606 and for the red and green cells in the induction motor 606 and for the red and green cells in the motor 608.

A computer 620 is associated with the induction motors 604 and 606 and 608 to process the signals from the pairs of cells associated with the motor.

When it is desired to move the head linearly from the first position, the signals from the cells are combined in the computer 620 in a first particular relationship to produce a linear movement of the head 603 from the first position to the second position. When it is desired to rotate the head at the second position, the signals from the cells are combined in the computer 620 in a second relationship to produce a rotary movement of the cells about a fixed point as a fulcrum. The head 603 may then be moved linearly from the second position to a third position. As will be appreciated, the signals from the cells may be simultaneously combined by the computer in the first and second relationships to produce simultaneously a linear movement of the head and a rotation of the head. It will also be appreciated that the head may simultaneously be moved through a curved path and rotated by the embodiment shown in FIGS. 19 and 20.

FIG. 21 illustrates an arrangement in an induction motor for indicating the velocity of movement of a head relative to a platen along a particular axis. The head includes a pair of primary windings 650 and 652 respectively disposed on alternate poles 654 and 656. The poles are spaced from each other in the *x*-direction. The primary windings 650 and 652 receive a signal which has a frequency $\omega$. This signal causes eddy currents to be induced in a platen 660 disposed in spaced but contiguous relationship to the head. These eddy currents in turn induce signals in windings 662 and 664 respectively disposed on alternate poles 666 and 668. The windings 662 and 664 are connected in series to produce a periodic signal $l = K \sin\omega t$ (dx/dt), where $x$ = the displacement of the head along the *x*-axis and dx/dt − the rate of displacement, or velocity, of the head along the *x*-axis and K = a constant. It will be appreciated that an arrangement similar to that illustrated in FIG. 21 may be provided to indicate the velocity of the head along the *y* -axis.

A hysteresis motor such as shown in FIG. 22 is also within the concept of the invention. The hysteresis motor may include a head constructed in a manner similar to that shown in FIGS. 2 and 3 for the induction motor. However, the platen may be solid sheet 700 formed of a hardenable steel. For example, the platen may be formed of iron with an alloying agent of cobalt such as a 15 percent cobalt chrome steel. When the platen is formed in this manner, it appears to be a weak permanent magnet. Accordingly, the production of flux by the head with a translating vector causes a magnetic hysteresis of a residual state of magnetization to be produced in the platen. When combined with the flux provided by the head, the magnetic hysteresis produced by the platen produces forces on the head for providing a translation of the head relative to the platen.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a system for providing a controlled relative movement between two members along first and second coordinate axes, the combination of:

a first member having magnetic properties, a second member disposed relative to the first member for independent displacement between the first and second members along each of the first and second coordinate axes, first means disposed on the first member for producing a magnetic flux extending between the first and second members in a first direction, second means disposed on the first member and operatively coupled to the first means for introducing signals of particular characteristics to the first means to obtain a vectorial translation of the flux between the first and second members along the first axis, third means disposed on the first member for producing a magnetic flux extending between the first and second members in the first direction, and fourth means disposed on the first members and operatively coupled to the third means for introducing signals of the particular characteristics to the third means to obtain a vectorial translation of the flux between the first and second members along the second axes, and fifth means disposed on the second member and responsive to the vectorial translations of the magnetic fluxes produced by the first and third means for producing in such first and third means energy changes which cooperate with the magnetic flux respectively produced by the first and third means in producing forces on the first member relative to the second member to obtain movements of the second member relative to the first member along the first and second coordinate axes.

2. In the system set forth in claim 1, the fifth means being electrically conductive and being responsive to the vectorial translation of the magnetic flux produced by the first means for producing in the electrically conductive means an electrical current in a direction transverse to the first direction to cooperate with such magnetic flux in producing a force on the first member relative to the second member along the first coordinate axis, the electrically conductive means being responsive to the magnetic flux produced by the third means for producing in the electrically conductive means an electrical current in a direction transverse to the second direction to cooperate with such magnetic flux in producing a force on the first member relative to the second member along the second coordinate axis.

3. In the system set forth in claim 1, the fifth means being responsive to the vectorial translation of the magnetic flux respectively produced by the first and third means to produce a residual state of magnetization in the second member for cooperating with such magnetic flux in producing a force on the first member relative to the second member to move the first member relative to the second member along the first and second coordinate axes.

4. In the system set forth in claim 1, sixth means cooperative with the fifth means and responsive to the energy changes produced in the fifth means for indicating the displacement of the first member relative to the second member along the first coordinate axis, and seventh means cooperative with the fifth means and responsive to the energy changes produced in the fifth means for indicating the displacement of the first member relative to the second member along the second coordinate axis.

5. In the system set forth in claim 2, means disposed on the first member and responsive to the eddy currents produced in the conductive means for inhibiting any rotation of the first member relative to the second member about an axis substantially normal to the surface defined by the first and second axes.

6. In the system set forth in claim 1, the first and second members being planar.

7. In a system for providing a controlled relative movement between two members along first and second coordinate axes, the combination of:

a first member having magnetic properties, a second member disposed in contiguous relationship to the first member for independent displacement between the first and second members along each of the first and second coordinate axes, first means disposed on a particular one of the first and second members for producing a magnetic flux in a first direction in the first and second members, second means operatively coupled to the first means for introducing signals to the first means to obtain a vectorial translation of the magnetic flux between the first and second members along the first axis, third means disposed on the particular one of the first and second members for producing in the first and second members magnetic flux in the first direction, fourth means operatively coupled to the third means for introducing signals to the third means to obtain a vectorial translation of the magnetic flux between the first and second members along the second axis, and fifth means disposed on the other one of the first and second members and responsive to the vectorial translation of the magnetic flux along the first axis for producing in such member energy changes for cooperating with the magnetic flux produced by the first means to produce a force on the first member for providing a movement of the first member relative to the second member along the first coordinate axis, the fifth means being responsive to the vectorial translation of the magnetic flux along the second axis for producing in such member energy changes for cooperating with the magnetic flux produced by the third means to produce a force on the first member for providing a movement of the first member relative to the second member along the second coordinate axis.

8. In the system set forth in claim 7, the fifth means being electrically conductive and being disposed on the other one of the first and second members and responsive to the vectorial translations of the magnetic flux produced by the first means for producing in such member eddy currents in a direction for cooperating with the magnetic flux produced by the first means to produce a force on the particular member for providing a movement of the particular member relative to the other member along the first coordinate axis, the fifth means also being responsive to the vectorial translation of the magnetic flux produced by the third means for producing in such member eddy currents in a direction for cooperation with the magnetic flux produced by the third means to produce a force on the particular member for providing a movement of the particular member relative to the other member along the second coordinate axis.

9. In the system set forth in claim 7, the fifth means being responsive to the vectorial translation of the magnetic flux produced by the first and third means to produce a magnetic hysteresis in the other member for cooperating with such magnetic flux in producing a force on the particular member relative to the other member along the first and second coordinate axes.

10. The system set forth in claim 8 wherein the electrically conductive means are in the form of a grid structure on the other member in contiguous relationship to the particular member and wherein means are movable with the particular member in contiguous relationship to the grid structure and interact with the grid structure to provide an indication of the displacement of the particular member relative to the other member along the pair of coordinate axes.

11. The system set forth in claim 10 wherein means are disposed on the particular member in contiguous relationship to the grid structure and are responsive to the eddy currents in the electrically conductive means to inhibit any rotation of the particular member relative to the other member about an axis substantially normal to a surface defined by the first and second axes.

12. The system set forth in claim 7 wherein the first and second members are planar.

13. In a system for providing a controlled relative movement between two members along a particular axis, the combination of:

a first member having magnetic properties, a second member disposed in contiguous relationship to the first member for independent displacement between the first and second members along the particular axis, first means disposed on a particular one of the first and second members for producing magnetic flux in a first direction in the first and second members, second means operatively coupled to the first means for introducing signals to the first means to obtain a vectorial translation of the magnetic flux along the particular axis, third means disposed on the other one of the first and second members and responsive to the vectorial translation of the magnetic flux along the first axis for producing in the other member energy changes for cooperating with the magnetic flux to produce a force on the particular member relative to the other member to provide a movement of the particular member relative to the other member along the particular axis, and fourth means disposed on the particular one of the first and second members and responsive to the energy changes produced by the third means for inhibiting any rotation of the particular member relative to the other member about an axis substantially normal to a surface including the particular axis.

14. In the system set forth in claim 13, the third means being electrically conductive and being responsive to the vectorial translation of the magnetic flux along the first axis for producing in the other member eddy currents for cooperating with the magnetic flux to produce a force on the particular member relative to the other member to provide a movement of the particular member relative to the other member along the particular axis, and the fourth means being responsive to the eddy currents produced by the third means for inhibiting any rotation of the particular member relative to the other member about an axis substantially normal to a surface including the particular axis.

15. In the system set forth in claim 13, the third means having magnetic properties and being responsive to the vectorial translation of the magnetic flux along the first axis to produce in the other member a residual state of magnetization for cooperating with such magnetic flux in producing on the particular member relative to the other member a force to move the particular member relative to the other member along the first and second coordinate axes.

16. In a system as set forth in claim 14, the electrically conductive means being in the form of a grid and being disposed in contiguous relationship to the particular member and means disposed on the particular member and responsive to the movements of the particular member along the particular axis to provide an indication of the displacement of the particular member relative to the other member along the particular axis.

17. In a system as set forth in claim 16, the first and second members being planar and the grid constituting the electrically conductive means being defined by isolated magnetic portions and the indicating means having magnetic characteristics to respond to the isolated magnetic portions for indicating the displacement of the particular member relative to the other member along the particular axis.

18. In a system for providing a controlled relative movement between two members along a particular axis, the combination of:

a first member having magnetic properties, a second member disposed relative to the first member for independent displacement between the first and second members along the particular axis, first means disposed on the first member for producing a magnetic flux between the members in a first direction transverse to the particular axis, the magnetic flux being vectorially translatable along the first axis, second means disposed on the second member and defining a grid interrelationship with the magnetizable properties of the first member, the second means being responsive to the vectorial translation of the magnetic flux produced by the first means for producing in the second means energy changes in a direction for cooperating with the magnetic flux from the first means in producing a force on the first member relative to the second member to provide a movement of the first member relative to the second member along the particular axis, third means operatively coupled to the first means for selectively energizing the first means to obtain a controlled vectorial translation of the magnetic flux along the particular axis, and fourth means movable with the first member and responsive to the grid interrelationship between the second means and the magnetizable properties of the first member for providing an indication of the displacement of the first member relative to the second member along the particular axis.

19. In the system set forth in claim 18, the second means being electrically conductive and being responsive to the vectorial translation of the magnetic flux produced by the first means for producing in the second means an electrical current in a direction for cooperating with the magnetic flux from the first means in producing a force on the first member relative to the second member to produce a movement of the first member relative to the second member along the particular axis.

20. In the system set forth in claim 18,
the second means being responsive to the vectorial translation of the magnetic flux produced by the first means to produce in the second means a magnetic hysteresis for cooperating with such magnetic flux in producing a force on the first member relative to the second member to move the first member relative to the second member along the particular axis.

21. In the system set forth in claim 18,
the first and second members being planar and means disposed on the first member and responsive to the energy changes produced in the second means for inhibiting any rotation of the first member relative to the second member about an axis substantially normal to a surface defined by the particular axis.

22. In the system set forth in claim 19,
the first and second members being planar and means disposed on the first member and responsive to the electrical current produced in the second means for inhibiting any rotation of the first member relative to the second member about an axis substantially normal to a surface defined by the particular axis.

23. In the system set forth in claim 21,
means for providing signals representing desired displacements of the first member relative to the second member along the particular axis and servo means responsive to the signals representing the desired displacements and the indications of the displacement of the first member relative to the second member along the particular axis for adjusting the position of the first member relative to the second member along the particular axis to provide a correspondence between the desired displacement and the actual displacement of the first member relative to the second member along the particular axis.

24. In a system for providing a controlled relative movement between two members along first and second coordinate axes, the combination of:
a first member having magnetic properties,
a second member disposed relative to the first member for independent displacement between the first and second members along each of the first and second coordinate axes,
first means including first windings disposed on the first member for producing a magnetic flux extending between the first and second members in a first direction transverse to the first coordinate axis, the magnetic flux being vectorially translatable along the first coordinate axis,
second means including second windings disposed on the first member for producing a magnetic flux extending between the first and second members in the first direction, the magnetic flux being vectorially translatable along the second coordinate axis,
electrically conductive means disposed on the second member and interrupted by discrete segments and responsive to the vectorial translation along the first axis of magnetic flux produced by the first means for producing in the conductive means eddy currents to cooperate with such magnetic flux in producing a movement of the second member relative to the first member along the first coordinate axis, the electrically conductive means being responsive to the vectorial translation along the second axis of the magnetic flux produced by the second means for producing in the conductive means eddy currents to cooperate with such magnetic flux in producing a movement of the second member relative to the first member along the second coordinate axis, the eddy currents in the conductive means in turn producing magnetic flux,
third means including third windings disposed on the first member for responding to the magnetic flux produced by the eddy currents to indicate the displacement of the first member relative to the second member along the first coordinate axis,
fourth means including fourth windings disposed on the first member for responding to the magnetic flux produced by the eddy currents to indicate the displacement of the first member relative to the second member along the second coordinate axis,
fifth means operatively coupled to the first means for introducing signals to the first means to obtain a vectorial translation along the first axis of the magnetic flux produced by the first means, and
sixth means operatively coupled to the second means for introducing signals to the second means to obtain a vectorial translation along the second axis of the magnetic flux produced by the second means.

25. In the system set forth in claim 24,
the third windings being connected in a relationship to inhibit any rotation of the first member relative to the second member about an axis substantially normal to a surface defined by the first and second axes.

26. In the system set forth in claim 25,
the first and second members being planar and the first member being disposed in displaced but contiguous relationship to the second member.

27. In the system set forth in claim 5,
the means for inhibiting rotation of the first member relative to the second member being magnetic.

28. In a system for providing a controlled relative movement between two members along first and second coordinate axes, the combination of:
a first member having magnetic properties,
a second member disposed relative to the first member for independent displacement between the first and second members along each of the first and second coordinate axes,
first means disposed on the first member and energizable for producing a magnetic flux extending between the first and second members in a first direction transverse to the first coordinate axis,
second means disposed on the first member in spaced relationship to the first means along the first axis and energizable for producing a magnetic flux extending between the first and second members in the first direction,
third means disposed on the first member and energizable for producing a magnetic flux extending between the first and second members in the first direction, fourth means disposed on the first member in spaced relationship to the third means along the second means and energizable for producing a magnetic flux extending between the first and second members in the first direction, fifth means operatively coupled to the first and second means for introducing signals to the first and second means to obtain a vectorial translation along the first axis of the magnetic flux produced by the first and second means, sixth means operatively coupled to the third and fourth means for introducing signals to the third and fourth means to obtain a vectorial translation along the second axis of the magnetic flux produced by the third and fourth means, seventh means disposed on the first member at the position of the first means for producing signals representing the positioning of the first means relative to the second member along the first coordinate axis, eighth means disposed on the first member at the position of the second means for producing signals representing the positioning of the second means relative to the second member along the first coordinate axis, ninth means disposed on the second member and responsive to the vectorial translation along the first axis of the magnetic fluxes produced by the first and second means for producing in such ninth means energy changes which cooperate with such magnetic flux in producing a translational force on the first member relative to the second member along the first axis, the ninth means being responsive to the vectorial translation along the second axis of the magnetic fluxes produced by the third and fourth means for producing in such ninth means energy changes which cooperate with such magnetic flux in producing a translational force on the first member relative to the second member along the second axis, and tenth means responsive to the signals produced by the seventh and eighth means for combining these signals in a first particular relationship and introducing these signals to the fifth means to obtain the energizings of the first and second means for a linear movement of the first member relative to the second member and for combining these signals in a second particular relationship and introducing these signals to the fifth means to obtain an energizing of the first and second means for a rotary movement of the first member relative to the second member about an axis substantially perpendicular to a surface defined by the first and second coordinate axes.

29. In the system set forth in claim 28, the ninth means being electrically conductive and being responsive to the vectorial translation along the first axis of the magnetic flux produced by the first and second means for producing in the ninth means a current in a direction transverse to the first direction to cooperate with such magnetic flux in producing a force on the first member relative to the second member along the first coordinate axis, the ninth means being responsive to the vectorial translation along the second axis of the magnetic flux produced by the third and fourth means for producing in the ninth means a current in a direction transverse to the first direction to cooperate with such magnetic flux in producing a force on the first member relative to the second member along the second coordinate axis.

30. In the system set forth in claim 29, the seventh means constituting pairs of means spaced from each other to produce quadrature-related signals and the eighth means constituting pairs of means spaced from each other to produce quadrature-related signals and the tenth means combining the quadrature-related signals from the fourth and fifth means in the first and second particular relationships.

31. In the system set forth in claim 16, the electrically conductive means having electrically conductive portions separated by electrically non-conductive portions and the indicating means disposed on the particular member being in the form of windings disposed in contiguous relationship to the electrically conductive means to have voltages induced in the windings in accordance with the flow of eddy currents through the electrically conductive means.

32. The combination set forth in claim 31, including, means for selectively energizing the first and second means to obtain a rotation of the second member relative to the first member about an axis substantially normal to a surface defined by the first and second directions.

33. The combination set forth in claim 1, including, sixth means responsive to the vectorial translation of the magnetic forces produced by the first and second means for producing in such means energy changes which cooperate with such magnetic flux in producing rotational forces on the first member relative to the second member about an axis substantially normal to a surface defined by the first and second coordinate axes.

* * * * *